Aug. 11, 1936.　　　J. A. HEDDEN　　　2,050,320
SCREW DRIVER
Filed July 3, 1935
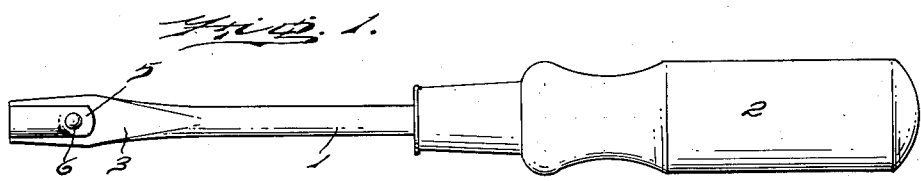
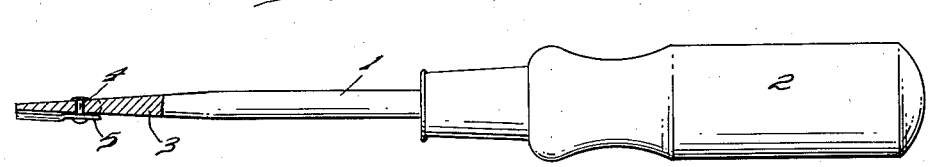
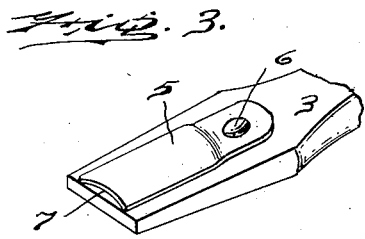
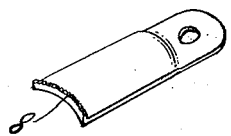
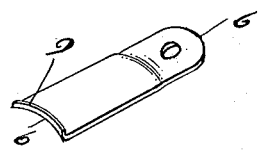
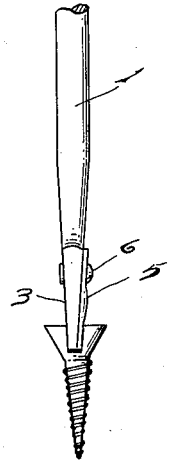
INVENTOR
James A. Hedden
BY
Herbert S. Fairbanks
ATTORNEY Patented Aug. 11, 1936

2,050,320

UNITED STATES PATENT OFFICE 2,050,320

SCREW DRIVER

James A. Hedden, Philadelphia, Pa.

Application July 3, 1935, Serial No. 29,601

2 Claims. (Cl. 145—50)

The object of my invention is to devise a novel screw driver which is provided with a novel construction of a resilient gripping member which will frictionally engage the wall of the kerf or slot in the head of a screw.

The gripping member, when it is not desired to use it, can be turned into an inoperative position.

It has heretofore been proposed in this art to rivet a spring gripping member to the forward end of a screw driver, but the construction and shape of the gripping member did not provide the proper frictional grip with the wall of the slot in the head of the screw.

It is therefore the object of my invention to improve on the construction and arrangement of the gripping member, and, to this end, it is curved at its forward end and if desired, provided with an offset frictional gripping face or lip, the contact face of which may be irregular.

With the above and other objects in view as will be hereinafter clearly set forth, my invention comprehends a novel construction and arrangement of a screw driver and wall gripping member.

Other novel features of construction and advantage will hereinafter clearly appear in the detailed description and the appended claims.

For the purpose of illustrating the invention, I have shown in the accompanying drawing typical embodiments of it, which in practice, will give satisfactory and reliable results. It is, however, to be understood that the various instrumentalities of which my invention consists can be variously arranged and organized, and my invention is not limited to the exact arrangement and organization of these instrumentalities as herein set forth.

Figure 1 is a side elevation of a screw driver and wall gripping member embodying my invention.

Figure 2 is a view taken at right angles to that of Figure 1, with the forward end of the screw driver shown in section.

Figure 3 is a perspective view of the front end of the screw driver shown in Figures 1 and 2.

Figure 4 is a perspective view, in detached position, of a gripping member showing another embodiment of my invention.

Figure 5 is a perspective view, in detached position, of another embodiment of my invention.

Figure 6 is a section on line 6—6 of Figure 5.

Figure 7 is a side elevation of a portion of the screw driver in cooperative relation with a screw.

Figure 8 is a sectional view of another embodiment of my invention.

Similar numerals indicate corresponding parts.

Referring to the drawing:—

1 designates the shank of a screw driver, having secured thereto in any desired or conventional manner a grasping handle 2. The shank at its forward end has opposite sides flat as at 3 and converging towards the forward end of the screw driver. The forward tapered end of the screw driver is provided with an aperture 4. 5 designates a frictional gripping member pivotally secured to the screw driver by means of a rivet 6 passing through the aperture 4. This gripping member is preferably made of spring sheet steel and has its forward portion curved or rounded as at 7 in order to provide a more positive gripping action in the kerf or slot in the head of a screw. The screw slot has parallel side walls so that when the forward end of the screw driver and gripping member are inserted into the slot, the gripping member will flatten out to a certain extent and firmly grip the juxtaposed wall of the slot in the screw head and the inner side edges will be pressed against the flat surface at the forward end of the screw driver.

In Figure 4, the forward end of the gripping member is provided with an outwardly deflected lip or rib 8 which has its wall contact surface irregular or roughened, while in Figure 5 the same construction is shown except that the wall contacting face at 9 is smooth.

In Figure 8, the gripping member is of the same formation as that shown in Figures 1 to 3 inclusive, except that its wall gripping face at the forward end as at 10 is irregular or burred.

In all of the embodiments herein shown, a much stronger frictional grip is obtained than if the gripping member was flat at its screw engaging end.

Having thus described my invention, what I claim as new and desire to secure by Letters Patent is:

1. The combination with a screw driver having opposite walls flat and converging at its forward end, of a frictional gripping member pivotally connected at its rear end to one of said flat faces and having its forward end curved transversely of the gripping member to increase its frictional grip with a side wall of a slot in the head of a screw.

2. The combination with a screw driver having opposite walls flat and converging at its forward end, of a frictional gripping member pivotally connected at its rear end to one of said flat faces and having its forward end curved transversely of the gripping member and offset to increase its frictional grip with a side wall of a slot in the head of a screw.

JAMES A. HEDDEN.